Figure 1:
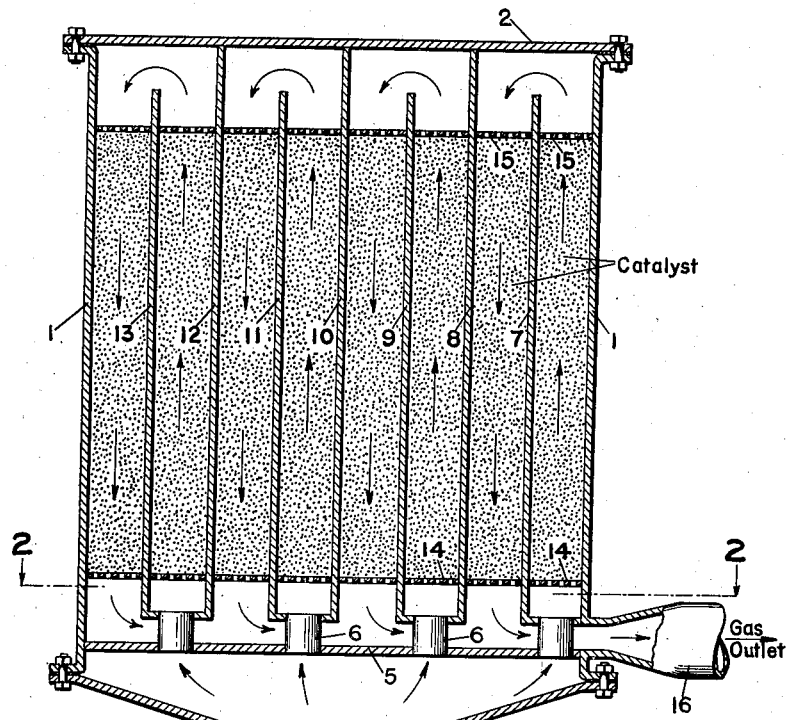

Aug. 23, 1938.      C. V. HERRMANN      2,127,561
HEAT EXCHANGE CATALYTIC CONVERTER
Filed April 29, 1936      2 Sheets-Sheet 1

INVENTOR.
CARL V. HERRMANN
BY Albert B. Griggs.
ATTORNEY.

Aug. 23, 1938.  C. V. HERRMANN  2,127,561

HEAT EXCHANGE CATALYTIC CONVERTER

Filed April 29, 1936  2 Sheets-Sheet 2

INVENTOR.
CARL V. HERRMANN
BY Albert B. Griggs
ATTORNEY.

Patented Aug. 23, 1938

2,127,561

UNITED STATES PATENT OFFICE 2,127,561

HEAT EXCHANGE CATALYTIC CONVERTER

Carl Victor Herrmann, Cleveland, Ohio, assignor, by mesne assignments, to E. I. du Pont de Nemours & Company, Wilmington, Del., a corporation of Delaware Application April 29, 1936, Serial No. 77,001

2 Claims. (Cl. 23—288)

This invention relates to catalytic converters for exothermic gas phase reactions, and is particularly directed to apparatus and processes for the catalytic oxidation of sulfur dioxide wherein at one zone the addition of heat is required and at another zone the extraction of heat is required and such zones are arranged in a contiguous and heat exchange relation whereby heat flows from the hot to the cold zones.

One type of converter heretofore extensively employed simply conducts hot sulfur dioxide-containing gases into a reaction space containing a suitable catalyst. With this type of device it is necessary to preheat the sulfur dioxide gases to the temperature required to initiate the conversion. The effluent gases from the converter are frequently hotter than is theoretically desirable because the exothermic nature of the reaction results in a heating of the gases. From a theoretical standpoint, the highest conversion efficiency would be expected if the gases could be held to temperatures no higher than those required for rapid conversion. This follows, of course, from the fact that at increasingly higher temperatures, sulfur trioxide dissociates with a resulting lower conversion efficiency.

To equalize the gas temperatures and to effect a preheating of the entrant sulfur dioxide-containing gas, it has been proposed to pass the entering gases in indirect heat exchange relation with the catalyst and in countercurrent to the flow of the gas undergoing oxidation. According to this method of operation, the gases leaving the converter are cooled to some extent by the entering gases, and the temperatures of the reaction are rendered somewhat more constant. This type of converter is disadvantageous, however, because of the increased size resulting from the provision of passages for the entering gas. This results particularly from the fact that the heat transfer is from a solid to a gas. It is well known that the heat transfer coefficients to a gas stream are exceedingly low, and as a result it has been necessary to incorporate rather large and complex heat exchange systems in this type of converter. Under most circumstances, it is not feasible to provide adequate heat transfer and, as a result, the effluent gases are at higher temperatures than is desirable.

It is an object of this invention to overcome, to a great extent, the disadvantages inherent in the heat exchange converters of the prior art. A further object of this invention is to provide apparatus and processes which are simple and economical and which require a minimum of equipment and space. A still further object of this invention is to provide simple and economical apparatus and processes wherein the lowest temperatures consistent with efficient conversion can readily be maintained. Further objects will be apparent hereinafter.

The objects of my invention are accomplished by apparatus and processes for catalytic exothermic gas phase reactions at one zone of which the addition of heat is required and at another zone of which the extraction of heat is required wherein such zones are arranged in a contiguous and heat exchange relation whereby heat flows, without the intervention of a fluid medium, from the hot to the cold zones.

By the use of such apparatus and processes, smaller equipment is required because the catalyst occupies most of the space in the converter whereas the prior art internal heat exchange converters require considerable space for gas heat-exchange passages. By the use of the apparatus and processes of my invention, moreover, the heat exchange is much more efficient than in the prior art devices and, as will be pointed out hereinafter, the heat exchange may be controlled for various operating conditions.

In an exothermic gas phase reaction the catalyst used is hotter at the exit end than at the entrance end. It is necessary that the catalyst at the entrance end be at a high enough temperature to obtain a reaction rate such that the desired conversion results from passing the gases thru all of the catalyst. Ordinarily the heat of incoming gases maintains the catalyst at the entrance end at a temperature high enough to initiate the reaction. To thus maintain the temperature of the catalyst at the entrance end, the gases must be heated before they are led to the catalyst, as by passing them thru heat exchange passages in the catalyst or by subjecting them to heat exchange with the exit gases or other hot fluids. All of these methods involve a heat transfer from solids to gases. Such solid to gas heat exchange is inefficient and requires relatively large amounts of heat exchange surface because of the low heat transfer coefficient between solids and gases.

My invention is based upon the recognition of two important principles. First, that the catalyst temperature rather than the entrance gas temperature is the important factor in initiating a catalytic reaction and, second, that the efficient heat transfer between solids would maintain the catalyst temperature without the necessity of heating a large volume of gas.

According to my invention, the temperature of the catalyst first contacted by the gases to be reacted is maintained by supplying heat directly from a hotter catalyst zone near the exit end. The heat transfer is effected by locating the zones in a contiguous relation so that the heat exchange occurs through the solids without the intervention of a fluid medium. The hotter zone also benefits because it rapidly loses heat to the cooler zone.

According to the procedures and apparatus of my invention, the entering gas need not be preheated to any considerable extent tho, as will appear hereinafter, it may be desirable to effect some preheating under certain circumstances.

Figure 2:
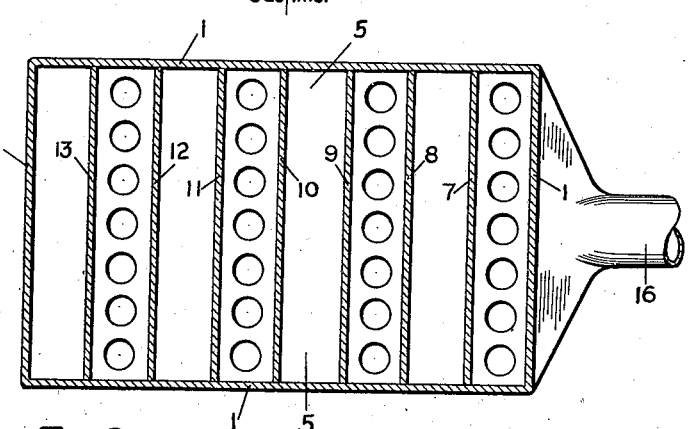
Figures 3, 4:
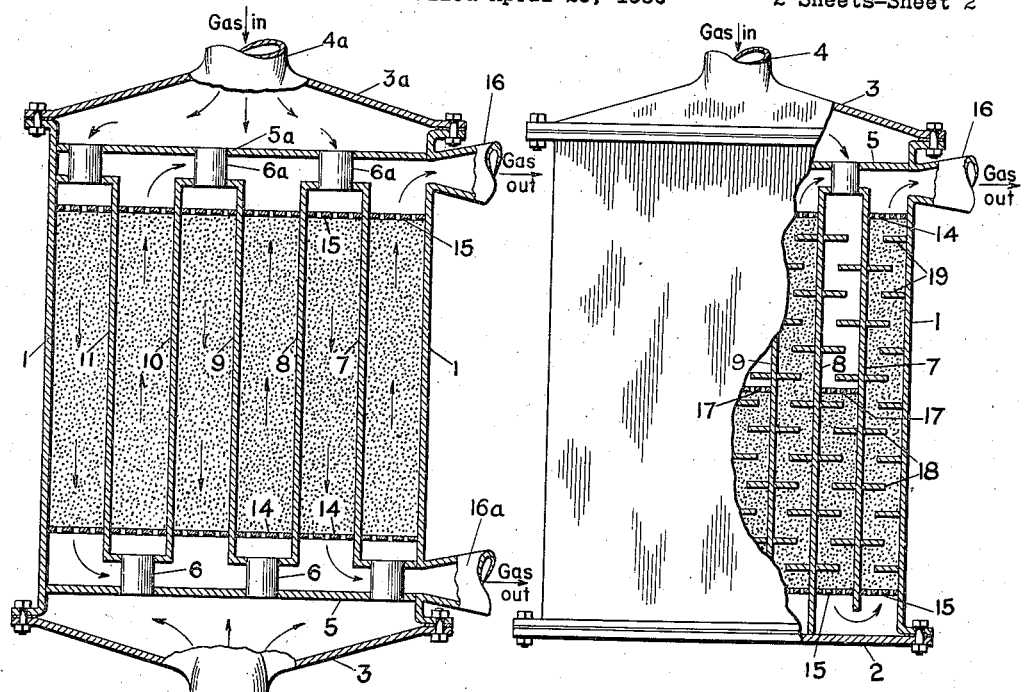
Figure 5:
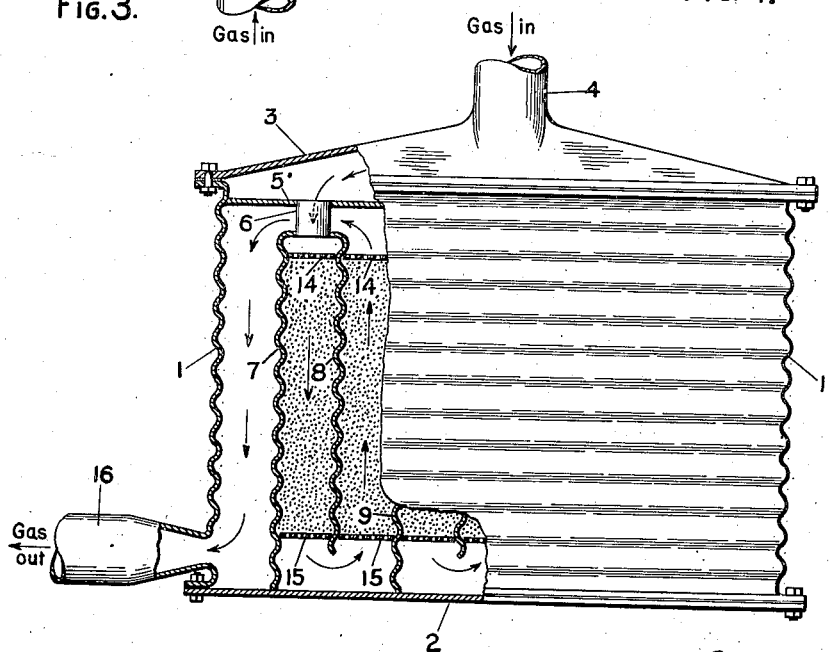

In order that the processes and apparatus of my invention may be better understood, reference should be had to the drawings wherein:

Figure 1 shows a cross-sectional elevation of a preferred apparatus of this invention, Figure 2 shows a section on the line 2—2 of Figure 1, Figure 3 illustrates a modified apparatus, according to my invention, Figure 4 shows a further modified apparatus partly in section, and Figure 5 illustrates a still further modified apparatus partly in section.

Considering the drawings in more detail, there will be seen in Figures 1 and 2 a converter of rectangular section having an outer wall 1. The converter is closed at the top by a wall 2 which can be removed when it is desired to replace the catalyst. At the lower end of the converter casing 1, there is provided a wall 3 thru which gases may enter the converter thru the passage 4.

Inside the converter and above the wall 3 is provided a header plate 5. The tubes 6 open thru the header plate 5, and conduct gases to the catalyst. The catalyst thru which the entering gases first pass is retained between the pairs of walls 1—7, 8—9, 10—11, and 12—13. The catalyst is held in place between the walls by grids 14 and 15.

After the gases reach the end of the catalyst passage, they turn and pass downwardly between the pairs of partitions 7—8, 9—10, 11—12, and 13—1. The partitions 7, 9, 11, and 13 do not extend to the wall 2 so that a gas passage will be left open. The walls 8, 10, and 12, however, should form a gas-tight joint with the wall 2. The catalyst is retained between these last mentioned pairs of walls by grids 15 and 14.

The gases leaving the catalyst from the chambers 7—8, 9—10, 11—12, and 13—1 pass out of the converter thru an exit pipe 16.

In operation, as will be apparent from the foregoing, the entering gases are led into the converter thru the pipe 4. They then pass from the header upwardly thru one set of passages, downwardly thru another set of passages, and out thru the pipe 16 as shown. The temperatures in successive catalyst zones will be increasingly high. Because of the heat liberated by the exothermic reaction, the catalyst at an inlet zone will be heated by the contiguous catalyst at an exit zone. It will be apparent from the drawings that the catalyst temperatures will tend to be equal throughout the course of the gas travel.

Any catalyst may be employed depending upon the reaction and the conditions of operation. For the oxidation of sulfur dioxide to sulfur trioxide I may, for instance, use catalysts such as platinum and vanadium. Inasmuch as the heat transfer is from solid to solid without the intervention of a fluid medium, it is preferred to use a catalyst mass which has a relatively high heat conductivity. For instance, the catalyst may be carried on a magnesium sulfate carrier. While the use of carriers which are less heat conductive is within the scope of my invention, the use of such materials as asbestos is not as advantageous as the use of carriers having a greater heat conductivity in apparatus such as that shown in Figure 1.

The specific conditions of operation of the converter of Figures 1 and 2 will depend, of course, upon the catalyst used, the reaction desired, the concentration of gases, and other such factors. One skilled in the art will readily be able to adjust and correlate the various factors so as to obtain the desired operating conditions.

Under most conditions of operation it will be found desirable to preheat the entering gases to a slight extent. This heating can easily be done using the exit gases with a small heat exchanger. According to one such method of operation with a gas which contains 10% of sulfur dioxide, a 95% conversion is obtained and the temperature of the entering gas is about 190° C., and the temperature of the exit gas is about 450° C.

The modification of Figure 3 is very similar in its construction and operation to the device shown in Figures 1 and 2. In the device of Figure 3, however, the gases instead of reversing their direction simply pass out of the converter. The heat exchange is provided by splitting the gas stream or by using two sources of gas and flowing them in opposite directions thru alternate courses of catalysts.

In Figure 3, as in Figures 1 and 2, 1 indicates the casing of a converter which is rectangular in section. At 3 is shown a closure provided with a gas inlet 4. Inside the closure is a header plate 5. Gases entering at 4 pass thru tubes 6 into catalyst chambers 1—7, 8—9, and 10—11, provided with grids 14 and 15. Gases emerging from these passages leave the converter through the pipe 16.

The opposite end of the converter of Figure 3 is the same, and the elements corresponding to 3, 4, 5, 6, and 16 are designated, respectively, 3a, 4a, 5a, 6a, and 16a. It should be observed that except for the number of passages Figure 2 would represent a cross section taken at either end of Figure 3 as the section is taken at Figure 1.

In operation, gases entering the converter at 4 pass thru the pipes 6 upwardly thru the catalyst chambers 1—7, 8—9, 10—11 and out thru the pipe 16. The temperatures in the passages 1—7, 8—9, and 10—11 will, of course, be increasingly high from the bottom to the top.

The second stream of gases, similarly, enters the converter thru the passage 4a, passes thru the tubes 6a downwardly thru the catalyst chambers 7—8, 9—10, and 11—1, finally leaving the converter thru the exit pipe 16a. The temperatures in the passages 7—8, 9—10, and 11—1 increase, of course, from the top to the bottom of the converter.

It will then be evident that the hot portions of one set of chambers will be in contact with the cool portions of the other set, and the temperatures will be equalized thru the converter. The catalyst at the entering end of all of the chambers will be heated, and it will be unnecessary to preheat the entering gases to as high a temperature as is required to initiate the catalytic reaction.

The device shown in Figure 4 is similar to that shown in Figure 1, similar parts being represented by the same reference numbers. The catalyst in the various chambers is retained at one end by grids 15, as in Figure 1, and the catalyst at the opposite end of the passages 1—7, 8—9, etc. is likewise retained by grids 14, as in Figure 1. The catalyst in the passages for the entering gas is retained at the entrance end, however, by perforated plates 17, which are located intermediate the ends of the passages. By thus locating the catalyst at some distance from the entering pipe 6, the gases are preheated before they contact the catalyst. The distance between the grid 17 and the pipe 6 may be varied according to the amount of preheating of the gas desired. This type of operation is not preferred, however, because of the relatively inefficient transfer, and because it is preferable to utilize all of the converter space, preheating the gases if necessary with a small exit gas heat exchange converter.

The chamber walls 7, 8, 9, etc. of the converter of Figure 4 are provided, as shown, with plates or fins 18. These plates, being located in the catalyst mass, aid in the conduction and radiation of heat without the intervention of a fluid medium. Such fins would be particularly desirable when catalyst masses are used which have relatively poor heat conductivity, say, platinized asbestos. The plates 19 are provided in the end chambers as baffle walls to force the gas to follow a circuitous course.

The modified device shown in Figure 5 is very similar to that shown in Figures 1 and 2, and similar parts are indicated by the same reference numbers. As will be evident from the drawings, the walls of the catalyst chambers are made of corrugated material. The use of corrugated material in this manner increases the mechanical strength of the structure and also provides a somewhat greater surface for heat exchange by conduction.

In the device of Figure 5 the exit gases pass over the tubes 6 and outwardly and downwardly thru the passage 1—7. The gases then leave the converter thru the exit pipe 16. By causing the exit gases to pass concurrent to the flow of the gases in the catalyst chamber 7—8, some additional heat is supplied to the catalyst in this chamber. Of course, the efficiency of the heat exchange from the gas to the catalyst thru the wall 7 is much less than the heat exchange obtained in the other units from solid to solid, but the additional heat may be of considerable value in some circumstances.

While I have discussed a number of specific types of apparatus and processes above, it will be understood that those skilled in the art may readily design numerous equivalent devices and processes without departing from the spirit of my invention.

I claim:

1. In an apparatus for conducting catalytic exothermic gas-phase reactions, a heat exchange converter comprising a converter casing; means within said casing adapted to hold catalytic material and arranged to divide said casing into two separate gas chambers; said means including a plurality of parallel tubular catalytic reaction passages, each of which is constructed substantially in the form of a hollow prism, and has a wall of heat conducting material in common with at least one other passage whereby any one passage is contiguous with and forms a part of at least one other passage; catalytic material filling a substantial portion of each of said passages and presenting in transverse section an area composed of individual areas of catalytic material bounded by the sides of said passages whereby adjacent areas of catalytic material are separated by an area of heat conducting material and are in heat exchange relation therethru; said passage being so arranged that the similarly disposed ends of said passages communicate with one of said gas chambers and oppositely disposed ends of said passages communicate with the other of said gas chambers whereby gas flowing from one chamber to the other passes thru catalytic material in said passages; inlet and outlet means communicating with at least one of said gas chambers to respectively supply unconverted gas thereto and to withdraw converted gas therefrom; and gas distribution means arranged in said gas chambers for directing the flow of gas therein in such a manner that the flow of gas in contiguous passages is in opposite directions and the gas entering similarly disposed ends of alternate passages has substantially the same composition and flows in said alternate passages in the same direction, whereby the rate of liberation of heat of reaction at any given transverse section of any one passage is substantially the same as that at the same transverse section of any passage alternate thereto.

2. In an apparatus for conducting catalytic exothermic gas-phase reactions, a heat exchange converter comprising a converter casing; means within said casing adapted to hold catalytic material and arranged to divide said casing into two separate gas chambers; said means including a plurality of parallel tubular catalytic reaction passages, each of which is constructed substantially in the form of a hollow prism, and has a wall of heat conducting material in common with at least one other passage whereby any one passage is contiguous with and forms a part of at least one other passage; catalytic material filling a substantial portion of each of said passages and presenting in transverse section an area composed of individual areas of catalytic material bounded by the sides of said passages whereby adjacent areas of catalytic material are separated by an area of heat conducting material and are in heat exchange relation therethru; said passage being so arranged that the similarly disposed ends of said passages communicate with one of said gas chambers and oppositely disposed ends of said passages communicate with the other of said gas chambers whereby gas flowing from one chamber to the other passes thru catalytic material in said passages; inlet and outlet means communicating with both of said gas chambers to respectively supply unconverted gas thereto and to withdraw converted gas therefrom; and gas distribution means for dividing each of said gas chambers into inlet and outlet chambers communicating respectively with said inlet and outlet means and so arranged that similarly disposed ends of contiguous passages communicate respectively with the inlet and outlet chambers of one of said gas chambers and oppositely disposed ends of any one passage communicate respectively with the inlet chamber of one of said gas chambers and the outlet chamber of the other of said gas chambers.

CARL VICTOR HERRMANN.